(No Model.)
C. H. PARSHALL.
REFRIGERATING APPARATUS.
No. 485,217. Patented Nov. 1, 1892.
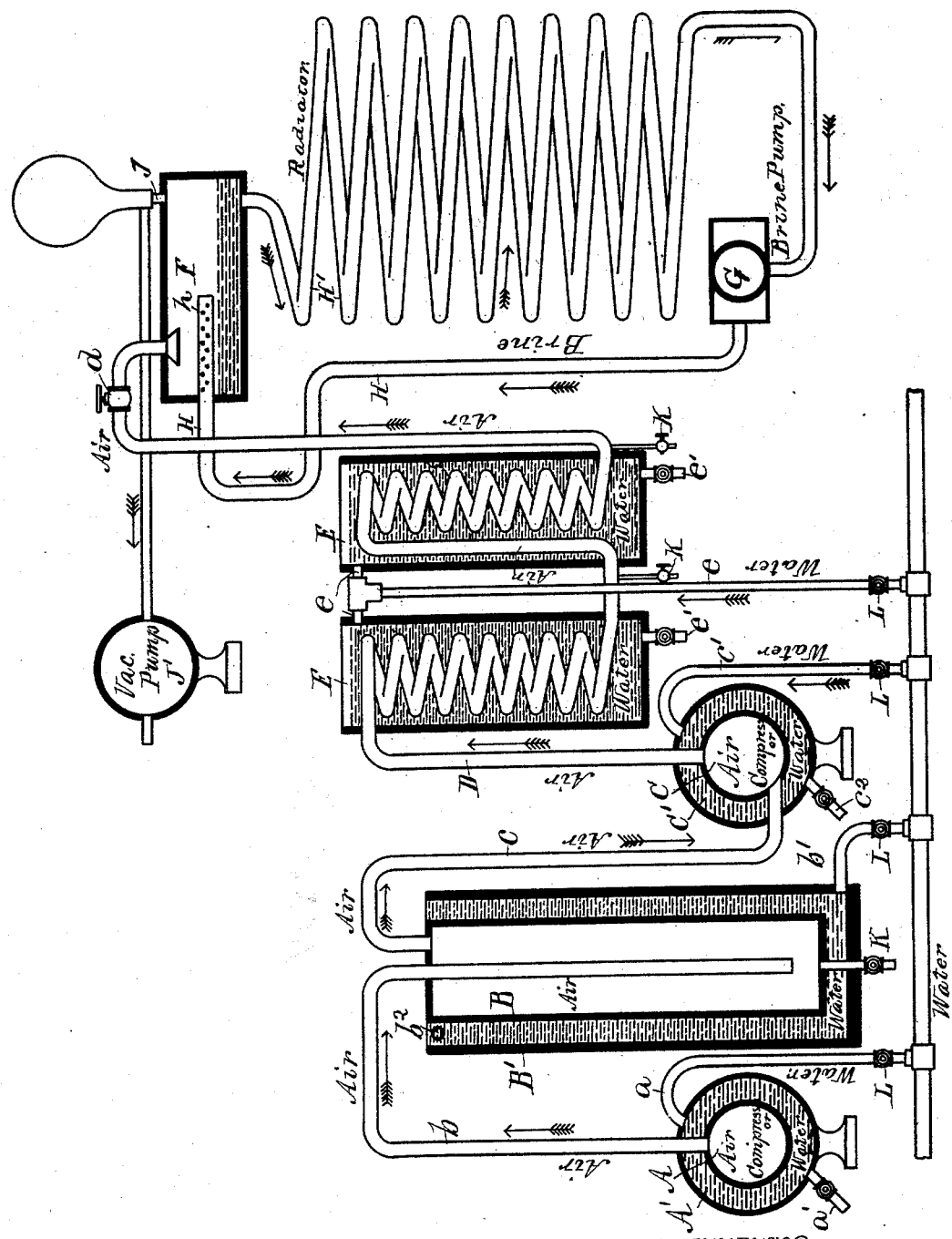
WITNESSES
C. J. Shipley.
W. G. Hodge.
INVENTOR
Charles H. Parshall
by Parker & Burton
his Attorneys.

UNITED STATES PATENT OFFICE.

CHARLES H. PARSHALL, OF DETROIT, MICHIGAN.

REFRIGERATING APPARATUS.

SPECIFICATION forming part of Letters Patent No. 485,217, dated November 1, 1892.

Application filed November 17, 1891. Serial No. 412,230. (No model.)

*To all whom it may concern:*

Be it known that I, CHARLES H. PARSHALL, a citizen of the United States, residing at Detroit, county of Wayne, State of Michigan, have invented a certain new and useful Improvement in Refrigerating Apparatus; and I declare the following to be a full, clear, and exact description of the invention, such as will enable others skilled in the art to which it pertains to make and use the same, reference being had to the accompanying drawing, which forms a part of this specification.

In the drawing the figure is a diagrammatic view illustrating my invention.

It is the purpose of my invention to provide a practical means for refrigeration by the employment of brine or some refrigerating medium circulating in radiating-pipes through the apartments to be cooled, the said brine or similar refrigerant being brought to its low temperature by the expansion of compressed air into the brine in its circulating system, whereby the refrigeration due to the expansion of air is developed, preferably, in a small portion only of the brine before passing into its radiating-pipes.

In carrying out my invention, A represents an air-compressor, and A' a water-jacket surrounding the same, through which cold water may be caused to circulate from an inlet-pipe $a$ and exit-pipe $a'$ for maintaining the compressor cool.

$b$ is a discharge-pipe for leading the air therefrom into a reservoir B.

B' is a water-jacket surrounding this reservoir, through which cold water may be caused to circulate through inlet-pipes $b'$ and exit-pipe $b^2$.

C is a second air-compressor designed to receive from the conduit $c$ the compressed air from the reservoir B, that has been cooled, and compress the same to a still higher degree.

C' is a water-jacket surrounding this compressor, through which cold water may circulate through the inlet-pipe $c'$ and the exit-pipe $c^2$ for keeping the compressor cool.

D is a compressed-air conduit leading from the compressor C. It leads in coils through one or more cooling-tanks E, through which cold water is caused to circulate by means of inlet-pipes $e$ and exit-pipes $e'$. This compressed-air conduit D is provided with a suitable valve or pressure-regulator $d$, which permits the air to escape past the same at a fixed and uniform rate. The construction of this valve is not shown, since it may be any of the well-known pressure-regulator contrivances in common use. Beyond this valve the air expands and discharges into the expansion-chamber F.

G is a brine-pump employed to circulate the brine through the radiating-pipes H'. This brine is forced through the pipe H and is delivered into the expansion-chamber F, preferably in a spray from the perforated extremity $h$. Here it is brought instantly under the influence of the expanding air from the extremity of the air-pipe above it and is quickly refrigerated, the refrigerating energy expending itself solely upon this water in the spray and the small quantity that may be in the bottom of the expansion-chamber. It is thus observed that this volume is quickly refrigerated to a very low temperature without expending the refrigerating energy upon any large volume of water. As soon as the air by its expansion shall have expended its refrigerating energy it is discharged from the chamber through the exit-pipe J and is assisted so as to prevent any accumulation of pressure in the expansion-chamber by an exhaust-fan J'. After the brine has been sprayed into and thoroughly refrigerated in the expansion-chamber it is by the pump G drawn therefrom and caused to circulate through the radiating-pipes H', which are arranged in the apartment to be cooled. Here by extracting heat from the surrounding objects its temperature is raised and it passes again into and through the pump and is carried off to be again refrigerated in the expansion-chamber.

K represents drain-cocks for drawing off water of condensation in the compressed-air conduits, and L represents stop-cocks at suitable points for use when required.

Heretofore refrigeration has usually been produced by the employment of anhydrous ammoniacal gas or some other anhydrous gas or gas of a character that does not possess water or other constituent which will congeal at a temperature produced by expansion in the process. The use of air has been attended with the rapid accumulation and clogging of the air-passages by ice congealed from the moisture in the air employed in the process unless the air has been in some way treated to remove all moisture therefrom. The use of any other substance than air is accompanied by considerable expense, while a practical means for using natural air as the refrigerant conduces to economy.

In my device, hereinbefore described, it will be observed that air in its natural state is the medium employed. There is no possibility of the formation of ice from the moisture contained in the air until it arrives at the point of expansion. Here it expands directly into the expansion-chamber in contact with the spray of brine. This salt brine possesses, as is well known, the inherent quality of holding water in a liquid condition at a very low temperature, and it does this with the moisture contained in the air thus expanded, and so prevents accumulation of ice.

For the best working of the system the brine should be provided so as to stand at a level in the expansion-chamber a little below the perforated pipe $h$, so that the incoming brine may be sprayed therefrom.

What I claim is—

A refrigerating system consisting of brine-circulating pipes with a small expansion-chamber located on the line of said pipes and a pump adapted to circulate the brine through the said pipes, said brine being of a quantity to rest at a level in the expansion-chamber below that of the brine-inlet pipe, said brine-inlet pipe provided with perforations adapted to spray the entering brine, in combination with air-compressors, means for cooling the compressed air, and a conduit whereby said compressed air is led to and discharged through a pressure-regulator into said expansion-chamber in contact with the brine circulated by the pump, and an exit-passage for conveying away from the chamber the expanded air, substantially as described.

In testimony whereof I sign this specification in the presence of two witnesses.

CHAS. H. PARSHALL.

Witnesses:
C. F. BURTON,
EFFIE I. CROFT.